United States Patent
Markham et al.

(10) Patent No.: US 8,572,404 B2
(45) Date of Patent: Oct. 29, 2013

(54) SECURITY AND SAFETY MANAGER IMPLEMENTATION IN A MULTI-CORE PROCESSOR

(75) Inventors: Thomas R. Markham, Fridley, MN (US); Kevin Staggs, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 53 days.

(21) Appl. No.: 13/289,653

(22) Filed: Nov. 4, 2011

(65) Prior Publication Data

US 2013/0117803 A1 May 9, 2013

(51) Int. Cl.
*G06F 21/00* (2013.01)

(52) U.S. Cl.
USPC .................................. 713/189; 726/1; 726/30

(58) Field of Classification Search
USPC ........................................ 726/1, 30; 713/189
See application file for complete search history.

(56) References Cited

U.S. PATENT DOCUMENTS

| | | | |
|---|---|---|---|
| 4,679,166 A * | 7/1987 | Berger et al. ..................... 713/2 |
| 7,231,664 B2 | 6/2007 | Markham et al. |
| 7,308,702 B1 | 12/2007 | Thomsen et al. |
| 7,308,706 B2 | 12/2007 | Markham et al. |
| 7,536,715 B2 | 5/2009 | Markham |
| 7,594,262 B2 | 9/2009 | Hanzlik et al. |
| 2002/0133810 A1 * | 9/2002 | Giles et al. .................... 717/138 |
| 2006/0070122 A1 * | 3/2006 | Bellovin ......................... 726/14 |
| 2006/0206943 A1 * | 9/2006 | Ellison et al. .................. 726/26 |
| 2007/0204338 A1 * | 8/2007 | Aiello et al. .................... 726/11 |
| 2008/0016313 A1 * | 1/2008 | Murotake et al. .............. 711/173 |
| 2010/0287562 A1 * | 11/2010 | Jazdzewski .................... 719/313 |
| 2011/0145909 A1 | 6/2011 | Rachakonda et al. |
| 2011/0154471 A1 | 6/2011 | Anderson et al. |
| 2012/0331308 A1 * | 12/2012 | Fernandez Gutierrez .... 713/190 |

* cited by examiner

*Primary Examiner* — Michael Pyzocha
(74) *Attorney, Agent, or Firm* — Schwegman, Lundberg & Woessner, P.A.

(57) ABSTRACT

A system includes a multi-core computer processor. One or more cores of the multi-core computer processor are configured as a security co-processor for the system and for other cores of the multi-core processor, and one or more cores of the multi-core computer processor are configured as a safety manager co-processor for the system and for other cores of the multi-core processor. An operating system of the security co-processor and an operating system of the safety manager co-processor are independent of operating systems of the other cores of the multi-core processor. The security co-processor and the safety manager co-processor are configured to boot before the other cores and to enforce security policy and/or safety policy on the other cores.

18 Claims, 3 Drawing Sheets

SECURITY AND SAFETY MANAGER IMPLEMENTATION IN A MULTI-CORE PROCESSOR

TECHNICAL FIELD

The present disclosure relates to a security co-processor and a safety manager co-processor implemented on a multi-core processor.

BACKGROUND

An example of a security feature is a firewall, which is a device or set of devices designed to permit or deny network transmissions based upon a set of rules, and it is frequently used to protect networks from unauthorized access while permitting legitimate communications to pass. Other examples of security functions include storing and protecting sensitive material such as cryptographic keys, and the enforcement of white lists. A safety manager is a device that monitors a process, and shuts down that process if the parameters, variables, or output of the process strays into an unsafe condition.

Regarding firewalls, a traditional perimeter firewall normally takes a generalist, common denominator approach to protecting servers on the network. During the early years of the Internet, a perimeter firewall provided organizations with a reasonable level of protection from external attack. However, the age of mobile devices (Laptops, iPads, smart phones, etc.) has given rise to several issues. Employees frequently carry their computing devices outside of the corporate network (literally carrying them past the perimeter firewall), access networks from outside the corporate perimeter firewall, carry their devices back inside the perimeter firewall, and then plug them into the corporate network. This movement of devices outside of the perimeter firewall exposes the organization to risk because a compromised device can be brought back inside the enterprise network. This type of security model is often referred to as a hard crunchy outside with a soft chewy inside. Once inside the perimeter firewall, the attackers have access to a vast set of resources.

In response to such a security issue, distributed firewalls were proposed and developed. A distributed firewall can be deployed behind a traditional perimeter firewall, thereby providing a second layer of defense. Whereas a perimeter firewall takes a generalist approach, a distributed firewall can serve as a specialist. Additionally, a distributed firewall, like a perimeter firewall, protects an enterprise network's servers and end-user machines against unwanted intrusion. A distributed firewall is a host-resident security software application, and it offers the advantage of filtering traffic from both the Internet and the internal network, thereby preventing hacking attacks that originate from both the Internet and the internal network. This can be important because the attacks that originate from within an organization may be the most costly and destructive.

Distributed firewalls are very much like perimeter firewalls, except that they offer several important advantages like central management, logging, and in some cases, access-control granularity. The ability of a distributed firewall to gather reports and maintain updates centrally makes distributed security practical. Distributed firewalls can assist to accomplish this in at least two ways. First, remote end-user machines can be secured. Second, critical servers on the network can be secured, thereby preventing intrusion by malicious code and "jailing" other such code by not letting the protected server be used as a launch pad for expanded attacks.

DETAILED DESCRIPTION

Figure 1:
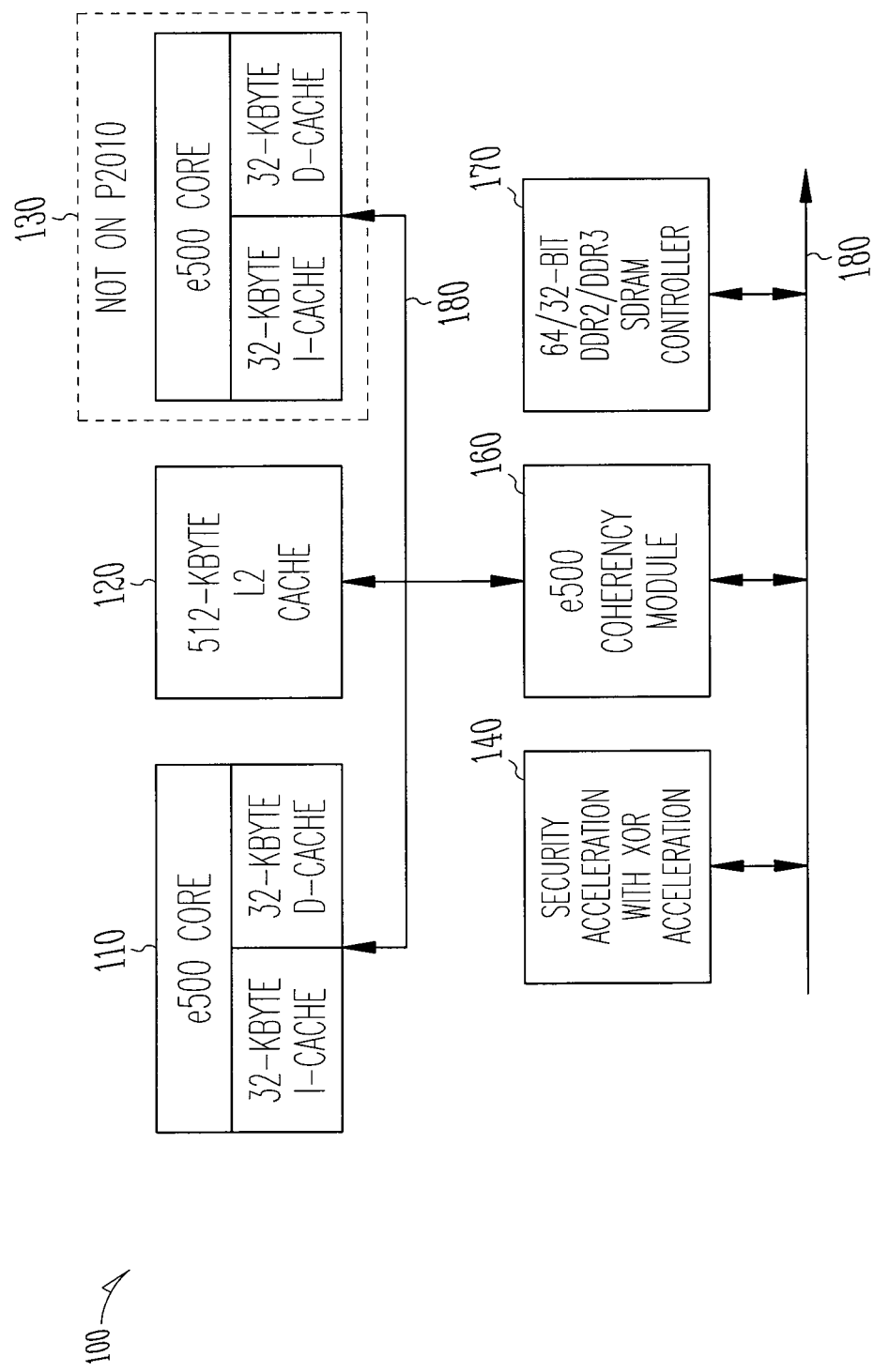
FIG. 1 illustrates an example of a multi-core processor architecture.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

Regarding the firewall aspect of security systems, it has been put forth that a key to the increased security provided by a distributed firewall is that in many instances it is implemented on a separate processor running its own operating system. That is, a distributed firewall runs on a processor completely independent of the operating system on the host. In such cases, there is nothing that malicious software on the host or a hostile insider sitting at the keyboard with administrator access can do to subvert the distributed firewall.

The implementation of a separate processor to run a distributed firewall can be executed using several different approaches. First, a distributed firewall can be implemented on a network interface card. Second, a distributed firewall can be implemented on an external inline device, wherein the firewall is simply a bump in the wire Ethernet firewall. However, a distributed firewall implemented on an external inline device cannot effectively secure machines that connect via wireless without adding a lot more hardware. Third, a distributed firewall can be implemented on a hardware security module in addition to the main processor. Of course the downside of such a hardware security module is that it requires the purchase and integration of an additional processor (i.e., the hardware security module itself) into every device, which significantly increases cost.

In an embodiment, a multi-core processor architecture is used in a manner such that one of the cores (e.g., core 0) may be designated as a security co-processor and/or a safety manager co-processor. The security co-processor and safety manager co-processor could be on the same core, each co-processor could be on its own separate core, or one or each of the co-processors could be on two or more cores. The security/safety core is independent of the code (e.g., operating systems) running on the other cores. Consequently, the other cores cannot corrupt the function of the security/safety core. Also, the security/safety core is able to observe the operation of the other cores. As a result and for example, the security core can observe code being loaded into the other cores and enforce a white list. Additionally, the security/safety core is able to enforce policies, such as safety and security policies, on the inputs and outputs of the system. For example, the security/safety core can enforce invariants, block all traffic on a particular port, and shut down the system if a particular variable in the system approaches an unsafe limit (e.g., a pressure greater than 100 psi).

Using a dedicated core or cores as a security co-processor and/or a safety manager co-processor potentially provides several security enhancements (for a distributed firewall and other security features), and several safety enhancements. For example, it provides a trusted boot. Specifically, the security co-processor will boot first and perform security (i.e., integrity) checks on the other portions of the operating system loaded onto the other cores. It will also configure access control hardware such as the memory management unit (MMU).

A security co-processor implemented in a core of a multi-core processor can also prevent and/or detect a typical root kit, which is a program or set of programs used by a hacker or other intruder to both hide its presence on a computer system and to allow future access to the system. A root kit typically manipulates the data set that the operating system relies on, or alters the execution flow of the operating system. A security co-processor on a core of a multi-core processor can prevent and/or detect a typical root kit because the operating system, which a root kit is written to attack, is not running on the same core as the security co-processor. Consequently, the security co-processor will not be attacked by the root kit, since the separate core of the security co-processor is a master over the other cores and can monitor the processes on the other cores. The design of the system, including the boot sequence, ensures that the security co-processor can monitor the core running the operating system which is being attacked, but the operating system cannot observe or modify the security co-processor.

As noted, many chips which implement a multi-core architecture, such as the architecture 100 as is illustrated in FIG. 1, allow core 0 to run an operating system that is completely independent of the operating system on the other cores. Cores in addition to core 0 or instead of core 0 could also be used to run such an operating system that is independent of the operating system of other cores. Thus, it provides the separation necessary to support a distributed firewall and other security features. Specifically referring to FIG. 1, the core identified by reference number 110 could be designated as core 0, and the core identified by reference number 130 could be designated as the additional cores 1-N. FIG. 1 further illustrates a cache 120, security module 140, a coherency module 160, and a SDRAM controller 170, all of which are coupled via a bus 180.

Figure 2:
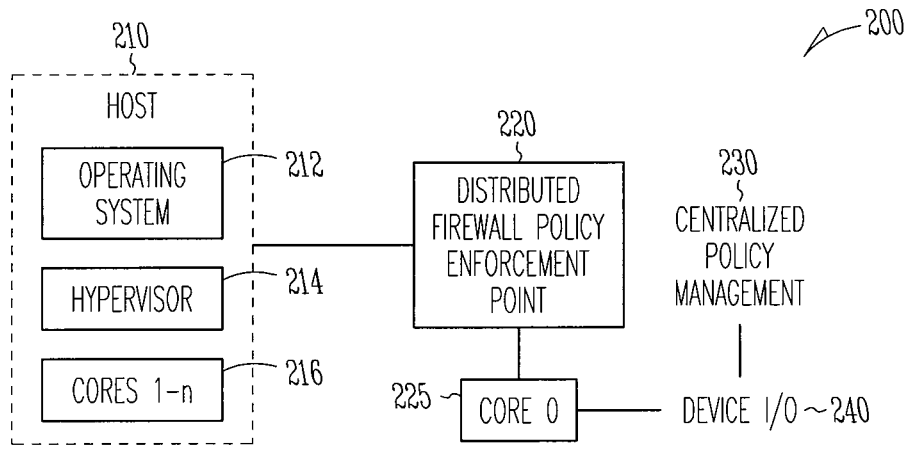
FIG. 2 illustrates an example model of an operating system and a manner in which it could be hosted on a multi-core architecture supporting a distributed firewall.

FIG. 2 shows a model 200 of how existing commercial operating systems (e.g., Green Hills Integrity, Microsoft Windows, Linux, etc.) could be hosted on a multi-core architecture supporting a distributed firewall and other security features. Specifically, a distributed firewall 220 runs on core 0 at 225, and controls device I/O at 240. The policy on the distributed firewall 220 is further influenced by central policy management 230. The distributed firewall 220 protects the host 210 and its operating system 212, hypervisor 214, and cores 1-N (216) from attacks and other intrusions.

A first advantage of a core 0 approach is that it supports all I/O regardless of whether it is wired or wireless. A second, and perhaps the biggest, advantage of a core 0 approach is that it has a very low per unit cost. Moreover, the cost for the core 0 approach can be expected to decrease even more as trends in the semiconductor industry lead to more and more multi-core chips.

A third advantage of a core 0 approach is that the security co-processor can serve as a tamper resistant and non-bypassable firewall for other cores of the processor. This allows the security co-processor to enforce filtering, secure communications, manage I/O to non-networked devices such as USB storage, and manage cryptographic keying material used for attestation, integrity checks, and secure communications. In this manner, the security co-processor can enforce security invariants (a security envelope) on the software processes running on the other cores. Enforcement of a firmware and/or software white list is also possible. This enforcement can limit the impact of a compromised application.

A fourth advantage is that many current operating systems fail to use the available hardware to enforce a least privilege scenario. The result is that privilege escalation attacks are able to change critical files (e.g., DLL injection), which should only be changed when the system is in a maintenance mode. Therefore, in an embodiment of a single core-based security co-processor, the security co-processor can enforce a least privilege scenario. Such a least privilege scenario can include untrusted, user, supervisor, and maintenance privileges.

The untrusted privilege relates to executable code (e.g., active-X, javascript, and PDF documents) that was not explicitly loaded by a system administrator. The untrusted privilege has very limited access to RAM and no write access to certain files such as critical system files. The user privilege relates to software code that is run for a user. The user privilege roughly corresponds to shrink-wrapped applications running in user space on a system such as Windows® or Linux. This code typically runs on behalf of the user. The supervisor privilege mode has the ability to change operating system settings (e.g., file ACLs) and hardware settings (e.g., Memory Management Unit read/write/execute control bits and page tables) that are highly dynamic. A system can be configured such that the processor and/or any particular core of the processor enter this state nearly every second the system is running. This allows any process in supervisor space nearly unlimited control of the machine (e.g., maintenance mode). The maintenance privilege state relates to situations wherein significant, long term changes are made that affect the long term security of the system. For example, applying operating system and/or kernel updates, or updating trusted keys used for authentication. In an embodiment, the maintenance privilege requires explicit user action (analogous to Ctl-Alt-Del) in order to enter this state.

A fifth advantage is that such a core 0 embodiment permits invariant safety enforcement. Specifically, a safety manager can serve as a separate processing entity that enforces invariants (a safety envelope) on the broader control system and physical processes. Such a safety envelope could be implemented in virtually any processor-based system such as an industrial control process, a supervisory control and data acquisition process (SCADA), a system for a building control process, a control system for an aircraft, and a controller for a residential home or place of business.

Figure 3:
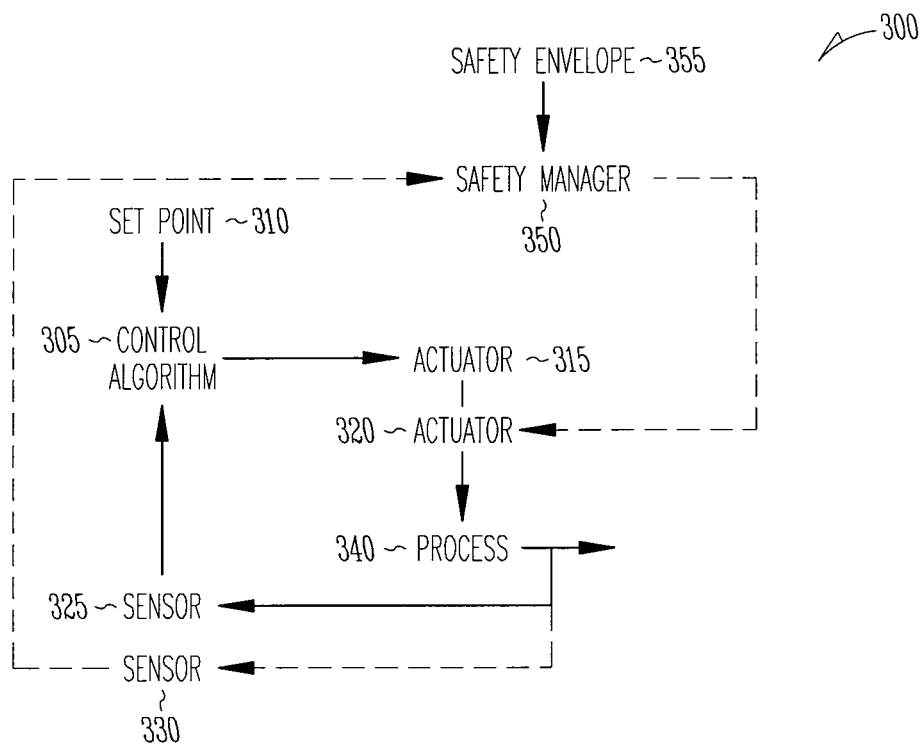
FIG. 3 illustrates an example of a process control with an external safety manager.

FIG. 3 is a block diagram of an example of such a safety manager system 300 for a sensor-based control system, such as a hot water heater for a hotel or other place of business. The system 300 enforces a safety envelope 355, via a safety manager 350. The hot water heater includes a control algorithm 305, which receives input of a set point 310 and a sensor 325. Depending on the set point 310 and the data readings from the sensor 325, an actuator 315 is adjusted so as to affect the workings of the process 340. However, if the safety manager 350 senses from a sensor 330 that an unsafe condition is occurring, then the safety manager 350 causes actuator 320 to take corrective action, such as by cutting off power to the hot water heater when the temperature of the water exceeds a safe threshold.

Figure 4:
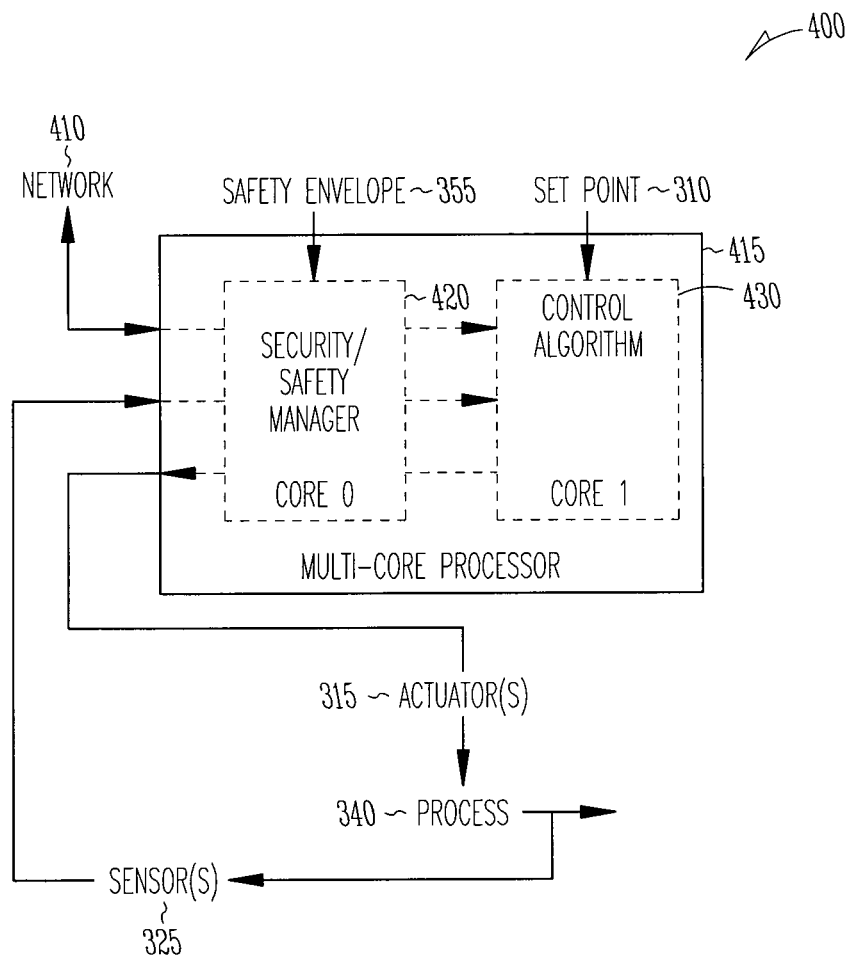
FIG. 4 illustrates an example of a system with both a security manager and a safety manager running in one core of a multi-core processor.

FIG. 4 is a block diagram of a system 400 that includes both a security manager and a safety manager running in one core (420) of a multi-core processor 415. As just noted in connection with FIG. 3, such a system includes a safety envelope 355, a set point 310, actuators 315, and sensors 325, all of which control a process 340. The security/safety co-processor 420 of core 0 monitors the incoming traffic on network 410, and enforces the security and safety functions of the system via control algorithm 430 in core 1.

Example Embodiments

Example No. 1 is a system that includes a multi-core computer processor. One or more cores of the multi-core computer processor are configured as a security co-processor for the system and for other cores of the multi-core processor. An operating system of the security co-processor is independent of operating systems of the other cores of the multi-core processor. The security co-processor is configured to boot before the other cores and to enforce security policy on the other cores.

Example No. 2 includes the features of Example No. 1, and optionally includes a system wherein the security co-processor comprises a single core.

Example No. 3 includes the features of Example Nos. 1-2, and optionally includes a system wherein the security co-processor comprises a distributed firewall.

Example No. 4 includes the features of Example Nos. 1-3, and optionally includes a system wherein the security co-processor is configured to control access control hardware including a memory management unit.

Example No. 5 includes the features of Example Nos. 1-4, and optionally includes a system wherein the security co-processor is configured to enforce one or more privilege levels including an untrusted level, a user level, a supervisor level, and a maintenance level; wherein the untrusted level comprises processing downloaded software code from a party other than an administrator of the system; wherein the user level comprises processing software code and data from a source approved by the administrator of the system; wherein the supervisor level comprises dynamic management of the system including changing operating system settings and changing hardware settings; and wherein the maintenance level comprises changes that affect the security of the system including processing kernel updates, updating keys for authentication, and privileged operations.

Example No. 6 includes the features of Example Nos. 1-5, and optionally includes a system wherein the untrusted level comprises a limited access to random access memory and no write access to certain files.

Example No. 7 includes the features of Example Nos. 1-6, and optionally includes a system wherein the system comprises one of more of a control system for an industrial process, a supervisory control and data acquisition process (SCADA), a system for a building control process, and a control system for an aircraft.

Example No. 8 includes the features of Example Nos. 1-7, and optionally includes a system wherein the security co-processor is configured to handle device input and device output in the system.

Example No. 9 is a system that includes a multi-core computer processor. One or more cores of the multi-core computer processor are configured as a safety manager co-processor for the system and for other cores of the multi-core processor. An operating system of the safety manager co-processor is independent of operating systems of the other cores of the multi-core processor. The safety manager co-processor is configured to boot before the other cores and to enforce safety policy on the other cores.

Example No. 10 includes the features of Example No. 9, and optionally includes a system wherein the safety manager co-processor comprises a single core.

Example No. 11 includes the features of Example Nos. 9-10, and optionally includes a system wherein the safety manager co-processor is configured to control access control hardware including a memory management unit.

Example No. 12 includes the features of Example Nos. 9-11, and optionally includes a system wherein the system comprises one or more of a control system for an industrial process, a supervisory control and data acquisition process (SCADA), a system for a building control process, and a control system for an aircraft.

Example No. 13 includes the features of Example Nos. 9-12, and optionally includes a system wherein the safety manager co-processor is configured to handle device input and device output in the system.

Example No. 14 is a system that includes a multi-core computer processor. One or more cores of the multi-core computer processor are configured as a security co-processor for the system and for other cores of the multi-core processor. One or more cores of the multi-core computer processor are configured as a safety manager co-processor for the system and for other cores of the multi-core processor. One or more of an operating system of the security co-processor and an operating system of the safety manager co-processor are independent of operating systems of the other cores of the multi-core processor. One or more of the security co-processor and the safety manager co-processor are configured to boot before the other cores and to enforce one or more of security policy and safety policy on the other cores.

Example No. 15 includes the features of Example No. 14 and optionally includes a system wherein the security co-processor and the safety manager co-processor comprise a single core.

Example No. 16 includes the features of Example Nos. 14-15 and optionally includes a system wherein the security co-processor comprises a distributed firewall.

Example No. 17 includes the features of Example Nos. 14-16 and optionally includes a system wherein one or more of the security co-processor and the safety manager co-processor are configured to control access control hardware including a memory management unit.

Example No. 18 includes the features of Example Nos. 14-17 and optionally includes a system wherein the security co-processor is configured to enforce one or more privilege levels including an untrusted level, a user level, a supervisor level, and a maintenance level; wherein the untrusted level comprises processing downloaded software code from a party other than an administrator of the system, and wherein the untrusted level comprises a limited access to random access memory and no write access to certain files; wherein the user level comprises processing software code and data from a source approved by the administrator of the system; wherein the supervisor level comprises dynamic management of the system including changing operating system settings and changing hardware settings; and wherein the maintenance level comprises changes that affect the security of the system including processing kernel updates, updating keys for authentication, and privileged operations.

Example No. 19 includes the features of Example Nos. 14-18 and optionally includes a system wherein the system comprises one or more of a control system for an industrial process, a supervisory control and data acquisition process (SCADA), a system for a building control process, and a control system for an aircraft.

Example No. 20 includes the features of Example Nos. 14-19 and optionally includes a system wherein one or more of the security co-processor and the safety manager co-processor are configured to handle device input and device output in the system.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:
    a multi-core computer processor;
    wherein one or more cores of the multi-core computer processor are configured as a security co-processor for the system and for other cores of the multi-core processor;
    wherein an operating system of the security co-processor is independent of operating systems of the other cores of the multi-core processor;
    wherein the security co-processor is configured to boot before the other cores and to enforce security policy on the other cores;
    wherein the security co-processor is configured to enforce one or more privilege levels including an untrusted level, a user level, a supervisor level, and a maintenance level;
    wherein the untrusted level comprises processing downloaded software code from a party other than an administrator of the system;
    wherein the user level comprises processing software code and data from a source approved by the administrator of the system;
    wherein the supervisor level comprises dynamic management of the system including changing operating system settings and changing hardware settings; and
    wherein the maintenance level comprises changes that affect the security of the system including processing kernel updates, updating keys for authentication, and privileged operations.

2. The system of claim 1, wherein the security co-processor comprises a single core.

3. The system of claim 1, wherein the security co-processor comprises a distributed firewall.

4. The system of claim 1, wherein the security co-processor is configured to control access control hardware including a memory management unit.

5. The system of claim 1, wherein the untrusted level comprises a limited access to random access memory and no write access to certain files.

6. The system of claim 1, wherein the system comprises one of more of a control system for an industrial process, a supervisory control and data acquisition process (SCADA), a system for a building control process, and a control system for an aircraft.

7. The system of claim 1, wherein the security co-processor is configured to handle device input and device output in the system.

8. A system comprising:
    a multi-core computer processor;
    wherein one or more cores of the multi-core computer processor are configured as a safety manager co-processor for the system and for other cores of the multi-core processor;
    wherein an operating system of the safety manager co-processor is independent of operating systems of the other cores of the multi-core processor;
    wherein the safety manager co-processor is configured to boot before the other cores and to enforce safety policy on the other cores;
    wherein the safety manager co-processor is configured to enforce one or more privilege levels including an untrusted level, a user level, a supervisor level, and a maintenance level;
    wherein the untrusted level comprises processing downloaded software code from a party other than an administrator of the system;
    wherein the user level comprises processing software code and data from a source approved by the administrator of the system;
    wherein the supervisor level comprises dynamic management of the system including changing operating system settings and changing hardware settings; and
    wherein the maintenance level comprises changes that affect the security of the system including processing kernel updates, updating keys for authentication, and privileged operations.

9. The system of claim 8, wherein the safety manager co-processor comprises a single core.

10. The system of claim 8, wherein the safety manager co-processor is configured to control access control hardware including a memory management unit.

11. The system of claim 8, wherein the system comprises one or more of a control system for an industrial process, a supervisory control and data acquisition process (SCADA), a system for a building control process, and a control system for an aircraft.

12. The system of claim 1, wherein the safety manager co-processor is configured to handle device input and device output in the system.

13. A system comprising:
    a multi-core computer processor;
    wherein one or more cores of the multi-core computer processor are configured as a security co-processor for the system and for other cores of the multi-core processor;

wherein one or more cores of the multi-core computer processor are configured as a safety manager co-processor for the system and for other cores of the multi-core processor;

wherein one or more of an operating system of the security co-processor and an operating system of the safety manager co-processor are independent of operating systems of the other cores of the multi-core processor;

wherein one or more of the security co-processor and the safety manager co-processor are configured to boot before the other cores and to enforce one or more of security policy and safety policy on the other cores;

wherein one or more of the security co-processor and the safety manage processor are configured to enforce one or more privilege levels including an untrusted level, a user level, a supervisor level, and a maintenance level;

wherein the untrusted level comprises processing downloaded software code from a party other than an administrator of the system;

wherein the user level comprises processing software code and data from a source approved by the administrator of the system;

wherein the supervisor level comprises dynamic management of the system including changing operating system settings and changing hardware setting; and wherein the maintenance level comprises changes that affect the security of the system including processing kernel updates, updating keys for authentication, and privileged operations.

14. The system of claim 13, wherein the security co-processor and the safety manager co-processor comprise a single core.

15. The system of claim 13, wherein the security co-processor comprises a distributed firewall.

16. The system of claim 13, wherein one or more of the security co-processor and the safety manager co-processor are configured to control access control hardware including a memory management unit.

17. The system of claim 13, wherein the system comprises one or more of a control system for an industrial process, a supervisory control and data acquisition process (SCADA), a system for a building control process, and a control system for an aircraft.

18. The system of claim 13, wherein one or more of the security co-processor and the safety manager co-processor are configured to handle device input and device output in the system.

* * * * *